United States Patent

[11] 3,612,699

[72] Inventors Kuniji Asano
Kawasaki;
Masamichi Shigehara, Yokohama, both of Japan
[21] Appl. No. 41,448
[22] Filed May 28, 1970
[45] Patented Oct. 12, 1971
[73] Assignee Tokyo Shibaura Electric Co., Ltd.
Kawasaki, Japan
[32] Priority May 23, 1969
[33] Japan
[31] 44/41,347

[54] APPARATUS FOR MEASURING THE ATTITUDE OF AN ARTIFICIAL SATELLITE ON THE GROUND
8 Claims, 4 Drawing Figs.
[52] U.S. Cl. .................................................. 356/147, 244/1
[51] Int. Cl. ...................................................... G01c 1/00, B64c
[50] Field of Search .......................................... 356/138, 147; 244/1

[56] References Cited
UNITED STATES PATENTS
3,491,969 1/1970 Muldson et al. .............. 356/147

Primary Examiner—Ronald L. Wibert
Assistant Examiner—C. Clark
Attorney—Oblon, Fisher & Spivak

ABSTRACT: An upright stand has a sphere rotatably mounted on the top thereof. An artificial satellite is in turn mounted on the sphere such that its center of gravity coincides with the center of sphere. The center of the sphere also coincides with the origin of three axes of coordinates of the artificial satellite, the three axes being orthogonal to each other.

A pair of optical-measuring devices are provided to measure the vertical deviations of two points on a circumference of a great circle, the center of which coincides with the center of the sphere, from a horizontal reference plane which includes the center of the sphere thereon. The aforesaid two points on the circumference of the great circle are on two orthogonal diameters of the great circle.

A device is provided to calculate the attitude of the artificial satellite from the two electrical outputs of the pair of optical-measuring devices and an electrical reference input signal which represents the coordinates of the center of the great circle.

PATENTED OCT 12 1971 3,612,699

INVENTORS
KUNIJI ASANO
MASAMICHI SHIGEHARA

BY Oblon, Fisher & Spivak

ATTORNEYS

INVENTORS
KUNIJI ASANO
MASAMICHI SHIGEHARA

BY *Oblon, Fisher & Spivak*

ATTORNEYS

APPARATUS FOR MEASURING THE ATTITUDE OF AN ARTIFICIAL SATELLITE ON THE GROUND

BACKGROUND OF THE INVENTION

1. Field of the Invention

The present invention relates generally to an apparatus for measuring the attitude of an artificial satellite on the ground, and more particularly to an apparatus which is capable of measuring the attitude of an artificial satellite being tested without the necessity of having any direct contact therewith.

2. Discussion of the Prior Art

In the past apparatus for testing the attitude control of an artificial satellite has been provided by simulating the navigation state of the artificial satellite in space on the ground. While somewhat satisfactory, the prior art apparatus required that direct contact be made with the artificial satellite. As such the prior art apparatus was generally complex and lacked a high degree of accuracy.

SUMMARY OF THE INVENTION

Accordingly, it is an object of this invention to provide a new and improved unique apparatus for remotely measuring the attitude of an artificial satellite on the ground.

Another object of the present invention is to provide a new and improved apparatus for measuring the attitude of an artificial satellite on the ground with high accuracy and without the necessity of having any direct contact therewith.

A further object of the subject invention is to provide a new and improved apparatus for testing an artificial satellite on the ground which is compact and simple to construct.

Briefly, in accordance with this invention, these and other objects are in one aspect attained by providing an upright support and rotatably mounting a sphere on the top thereof. An artificial satellite to be tested is mounted on the sphere such that the center of gravity thereof coincides with the center of sphere. The center of the sphere is made to coincide with an origin of three axes of the artificial satellite, the three axes being orthogonal to each other. Two of the aforesaid axes coincide with two orthogonal diameters of the great circle of the sphere and the third axes coincides with the center axis of revolution of the artificial satellite. A pair of optical-measuring devices are respectively provided and located and coupled without direct contact along the two axes which coincide with the two orthogonal diameters of a great circle of the sphere and in a plane of the great circle. The optical-measuring devices will indicate the vertical deviations of the great circle from a horizontal reference plane which includes the center of the great circle thereon. The two electrical output signals emanating from a pair of optical-measuring devices are applied, along with a reference electrical signal which represents the coordinates of the center of the great circle, to a device wherein the attitude of the artificial satellite is calculated and obtained.

BRIEF DESCRIPTION OF THE DRAWINGS

The present invention will become more fully understood from the following detailed description when taken in connection with reference to the accompanying drawings, wherein.

DETAILED DESCRIPTION OF THE PREFERRED EMBODIMENTS

Figure 1:
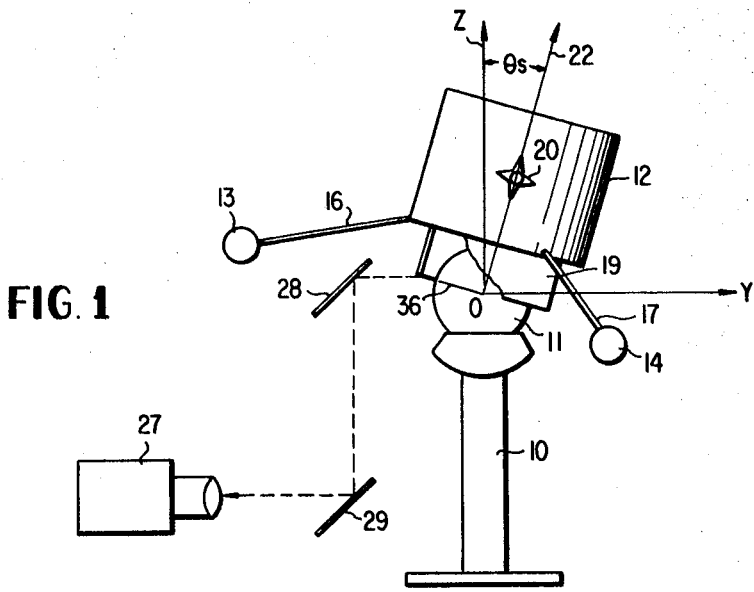
FIG. 1 is an elevational view of a preferred embodiment of the present invention.

Referring now to the drawings wherein like reference numerals designate identical, or corresponding parts throughout the several views, and more particularly to FIG. 1 thereof wherein is shown an upright support having a reference numeral 10. In order to rotatably mount a sphere 11 on the top of the support 10, the support 10 is provided with a concave top portion (not shown) of shape similar to the surface of the sphere 11. In addition, a plurality of steel balls (not shown) are located within the concave top portion in order to enable the sphere therein to rotate in a smooth fashion.

An artificial satellite is generally shown with a reference numeral 12 and the same is mounted on the sphere 11 such that the center of gravity of the artificial satellite coincides with the center of sphere. To assure this, as shown in FIG. 1, the artificial satellite 12 is provided with three weights 13, 14 and 15 each of which is respectively supported at a far end by three inclined rods 16, 17 and 18. The three rods 16, 17 and 18 extend in a downward direction from a lower edge portion of the artificial satellite 12 and the same are positioned 120 degrees apart in a plane view.

A cylindrical member 19 is mounted on the bottom of the artificial satellite 12 such that the lower peripheral edge thereof forms a great circle of the sphere and thereby includes the center of the sphere within the plane of the great circle.

The artificial satellite 12 includes a pair of conventional crosslike electromagnetically operable valves 20 and 21 which are mounted on the opposite sides of the cylindrical wall of the satellite and the same are used to control the attitude of the satellite and to cause it to rotate as hereinafter explained.

In order to rotate the artificial satellite 12 around a center axis 22 thereof, one of the laterally extending nozzles of either of the crosslike electromagnetic valves 20 and 21 will be selected to momentarily expel out a pressurized nitrogen gas and thereby apply a rotating torque to the artificial satellite. The nitrogen gas is contained in a reservoir (not shown) located within the artificial satellite. The electromagnetic valves 20 and 21 may be controlled by signals from any suitable wireless communication device capable of transmitting to the artificial satellite from the ground.

Likewise, the inclination of the center axis 22 of the artificial satellite 12 from a vertical axis may be controlled by ejection of the nitrogen gas from either of the vertically extending nozzles of the magnetic valves 20 and 21.

Figure 2:
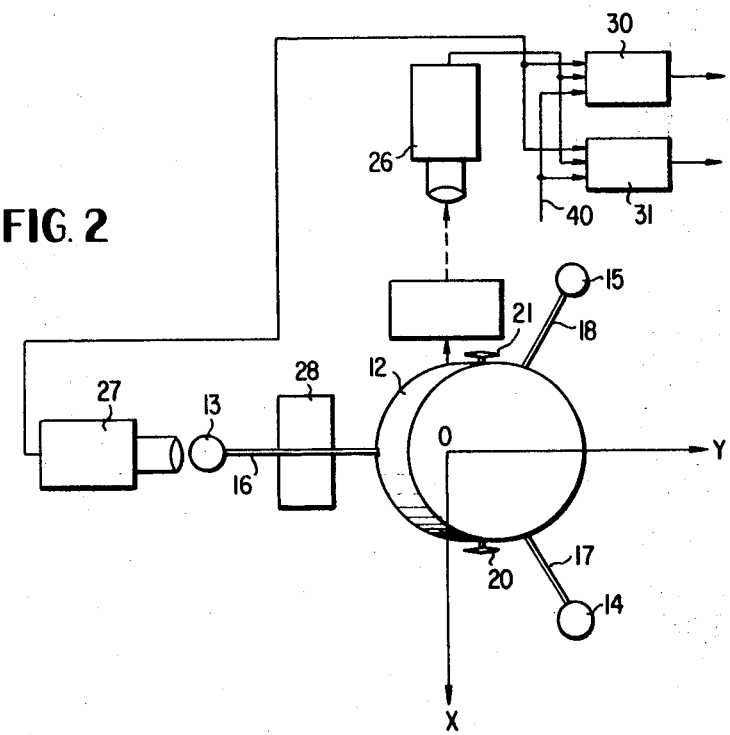
FIG. 2 is a plane view of the embodiment of FIG. 1.

In FIGS. 1 and 2 the three axes of the artificial satellite 12 are shown as including two orthogonal axes X and Y which make a horizontal reference plane that crosses at an origin 0 which in turn coincides with the center of the sphere. The other artificial satellite axis Z is orthogonal to both of the X and Y axes and extends in an upward direction.

With the artificial satellite 12 simulated on the upright support 10 the attitude of the artificial satellite may be readily obtained by measuring the inclination of the great circle which is formed by the lower edge of the cylindrical member 19 as the same is controlled by ejection of gas from the electromagnetic valves 20 and 21.

In order to measure the inclination it is necessary to measure three points located at different positions on the great circle. However, since one point is positioned at a predetermined coordinate, namely, to coincide with the center of the sphere, it is necessary to measure only the coordinates of the other two points.

Figure 4:
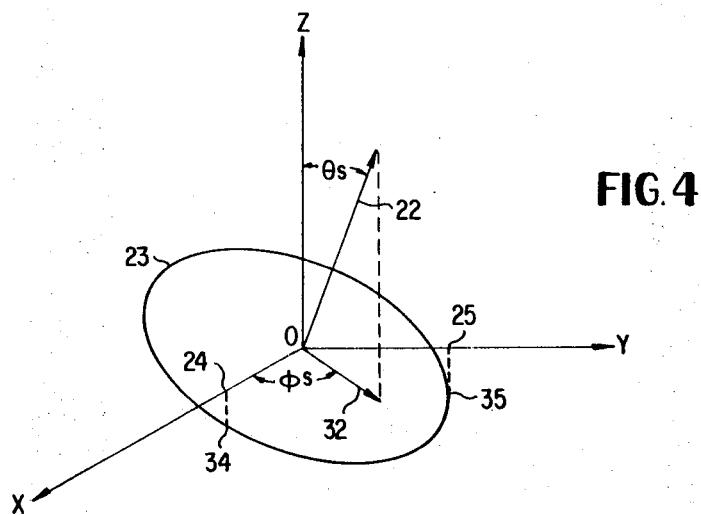
FIG. 4 shows a tilted view of a great circle of the artificial satellite.

Referring now to FIG. 4 a great circle 23 of the sphere 11 is shown and the same represents the lower edge of the cylindrical member 19 mounted on the bottom surface of the artificial satellite 12 as shown in FIG. 1. The great circle 23 is shown inclined to a reference horizontal plane 24 which is represented by the two coordinates axes X and Y. The vertical axis or center axis 22 of the artificial satellite is shown tilted from the vertical axis Z by an angle of elevation $\theta_s$. When the axis 22 is projected onto the reference horizontal plane X–Y, a projection thereof when positioned between the two coordinates axes X and Y will display the azimuth of the artificial satellite 12 by an angle $\Phi_s$, the azimuth being an angle between the reference coordinate axis X and the aforesaid projection on the X–Y plane.

It should be understood that the attitude of the artificial satellite may be obtained by knowing the elevation and the azimuth thereof. Furthermore, as described above, the elevation and azimuth may be readily provided by measuring the tilt of the great circle 23.

It should also be understood that the extent of the tilt of the great circle 23 may be selected by knowing three points which are positioned at different locations on the surface of the great circle.

As mentioned above, one coordinate point of the great circle is selected as the center O of the sphere 11. It is, therefore, only necessary to know the coordinates of the two points located within the plane of the great circle.

As is clearly shown in FIG. 4 when the artificial satellite 12 is tilted, two selected points 24 and 25 which were on the coordinates axes X and Y will move to new positions 34 and 35 on the inclined great circle. Now, if the coordinates of the projections of the points 24 and 25 which are projected on the great circle are determined, the inclination of a plane involving the inclined great circle may be measured so that the azimuth and elevation can be calculated therefrom and the attitude of the artificial satellite thereby obtained.

As shown in FIGS. 1 and 2 in order to measure the vertical deviations of the coordinates of the aforesaid points on the great circle and thereby obtain the desired elevation and azimuth information a pair of optically measuring devices 26 and 27 are provided along the direction of the reference axes X and Y. As clearly shown in FIG. 1, the image of a point to be inspected on the great circle is transmitted from the lower edge of cylindrical member 19 to the optically measuring device 27 located therebelow through a pair of reflecting mirrors 28 and 29. It should be understood, however, that if desired the mirrors 28 and 29 can be eliminated by positioning the device 27 at a higher level. The optically measuring device 26 and 27 may be, for example, conventional electro-optical displacement followers.

As is shown in FIG. 2, a pair of computing circuits or devices 30 and 31 is provided and each receives respective electrical signals representing the vertical deviations of the two points on the circumference of the great circle supplied from the output of the optically measuring devices 26 and 27. A standard electrical signal, corresponding to the coordinates of the center of the great circle, is applied over lead 40 to each of the computing devices 30 and 31. The computing device 30 will provide at the output thereof an electrical signal corresponding to an elevation of the artificial satellite and the computing device 31 will provide at the output thereof an electrical signal corresponding to the azimuth of the artificial satellite.

The attitude of the artificial satellite 12 may then be readily determined from the value of the outputs of the computing devices 30 and 31.

Figure 3:
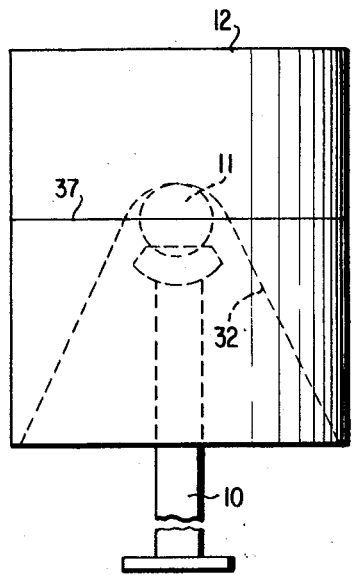
FIG. 3 shows an alternate arrangement for mounting the artificial satellite of the present invention.

FIG. 3 shows an alternative arrangement for mounting the artificial satellite 12 of the present invention and includes a deeply concave bore 32 at the bottom of the satellite which extends to an intermediate portion thereof in the direction of height of the artificial satellite. The concave shaped bottom is mounted on the sphere 11 and the center of gravity of the artificial satellite coincides with the center of sphere.

It should be understood that the artificial satellite of the present invention may be used to simulate the navigation state in space and that tests may be performed with the satellite on the ground and without any direct contact being made thereto.

Also with the present invention it is easy to select the elevation and azimuth of the artificial satellite to be tested by measuring the vertical deviations of only two points on the circumference of the great circle of the sphere on which the artificial satellite is rotatably mounted.

It should further be understood that in accordance with this invention, the great circle of the sphere 11 may be indicated by a mark 36 (see FIG. 1) written or etched onto the peripheral surface of the sphere, which mark may be inspected by any suitable optical means. Moreover, in the arrangement of FIG. 3 the great circle may be indicated by a mark 37 provided around the sidewall of the artificial satellite.

Obviously, numerous modifications and variations of the present invention are possible in the light of the above teachings. It is therefore to be understood, that within the scope of the teachings herein and the appended claims the invention may be practiced otherwise than as specifically described herein.

What is claimed and desired to be secured by Letters Patent of the United States is:

1. An apparatus for measuring the attitude of an artificial satellite on the ground comprising;
   an upright support,
   a sphere member rotatably mounted on top of said support with said artificial satellite mounted thereon such that the center of gravity of the artificial satellite substantially coincides with the center of the sphere,
   a device attached to said satellite and provided around the sphere for creating a great circle therearound,
   a pair of electro-optical devices for optically inspecting the vertical deviations of two points positioned at different locations on the circumference of said great circle from a reference horizontal plane which includes said center of sphere thereon, and for generating an output therefrom, and
   means connected to receive the outputs of said pair of electro-optical devices and an electric signal corresponding to the coordinates of said center of sphere for calculating the tilt of a plane including said great circle thereon whereby the attitude of said artificial satellite may be readily determined.

2. An apparatus for measuring the attitude of an artificial satellite on the ground according to claim 1, wherein
   said device provided around the center of said sphere to create a great circle therearound is a cylindrical member mounted on the bottom surface of said artificial satellite such that the center axis of the cylindrical member is aligned with the center axis of the artificial satellite and the lower edge of the cylindrical member makes the circumference of the great circle.

3. An apparatus for measuring the attitude of an artificial satellite on the ground according to claim 1, wherein
   said means connected to receive the outputs of said pair of electro-optical devices and said electric signal corresponding to the coordinates of the center of said sphere includes a pair of computers for separately calculating and generating signals corresponding in amplitude to the azimuth and elevation of the artificial satellite.

4. An apparatus for measuring the attitude of an artificial satellite on the ground according to claim 1, wherein
   said artificial satellite includes several weight members which extend downward from the bottom periphery of said artificial satellite through respective and elongated supporting rods, said rods being located around the artificial satellite and having substantially equal angle spaces therebetween in a given plane.

5. An apparatus for measuring the attitude of an artificial satellite on the ground according to claim 1, wherein
   said artificial satellite includes a deep concave bore therein which extends from he bottom surface of said artificial satellite to an intermediate portion thereof in the direction of height of the artificial satellite, said artificial satellite being mounted on said sphere at the top portion of said concave bore.

6. An apparatus for measuring the attitude of an artificial satellite on the ground according to claim 1, wherein
   said sphere includes a great circle mark therearound for indicating said great circle.

7. An apparatus for measuring the attitude of an artificial satellite on the ground according to claim 6, wherein
   said pair of electro-optical devices are arranged to inspect said great circle mark provided around the wall of said artificial satellite.

8. An apparatus for measuring the attitude of an artificial satellite on the ground according to claim 1 wherein
   a pair of electromagnetically operable valves are mounted on said artificial satellite and when remotely operated allow a gas to either rotate or incline said artificial satellite about an axis passing therethrough.